United States Patent
Yeh et al.

(10) Patent No.: US 11,757,800 B2
(45) Date of Patent: Sep. 12, 2023

(54) NETWORK INTERFACE DEVICE, ELECTRONIC DEVICE CONTAINING SAME, AND OPERATION METHOD OF THE NETWORK INTERFACE DEVICE

(71) Applicant: REALTEK SEMICONDUCTOR CORPORATION, Hsinchu (TW)

(72) Inventors: Lun-Wu Yeh, Hsinchu (TW); Chen-Feng Kuo, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 4 days.

(21) Appl. No.: 17/409,838

(22) Filed: Aug. 24, 2021

(65) Prior Publication Data
US 2022/0158955 A1    May 19, 2022

(51) Int. Cl.
*H04L 49/9057* (2022.01)
*H04L 47/722* (2022.01)
(Continued)

(52) U.S. Cl.
CPC .......... *H04L 49/9057* (2013.01); *H04L 47/34* (2013.01); *H04L 47/624* (2013.01); *H04L 47/722* (2013.01)

(58) Field of Classification Search
CPC ... H04L 1/1841; H04L 49/90; H04L 49/9057; H04L 47/34; H04L 47/624; H04L 47/722
See application file for complete search history.

(56) References Cited

U.S. PATENT DOCUMENTS

| 7,187,689 | B1 * | 3/2007 | Gupta | H04L 47/50 370/429 |
| 2002/0031125 | A1 * | 3/2002 | Sato | H04L 47/34 370/474 |

(Continued)

FOREIGN PATENT DOCUMENTS

CN    100486134 C    5/2009

OTHER PUBLICATIONS

OA letter of the counterpart TW application(appl. no. 109140340) dated May 31, 2021. Summary of the OA letter: Claim(s) 1-6 and 9-10 is/are rejected under Patent Law Article 22(2) as being unpatentable over reference 1 (CN 100486134 C).

*Primary Examiner* — Kan Yuen
(74) *Attorney, Agent, or Firm* — WPAT, PC

(57) ABSTRACT

A network interface device, an electronic device including same, and a method of operating same are provided. The network interface device is coupled to a host including a storage circuit. The network interface device includes a processing circuit and a packet receiving circuit which is used for receiving multiple network packets. The processing circuit performs the following steps: parsing the network packets to obtain multiple sequence numbers of the network packets; reordering the network packets based on the sequence numbers to generate reorder information; appending the reorder information to one of the network packets and generating packet order information, or generating the packet order information containing the reorder information; storing the packet order information in the storage circuit; and issuing an interrupt to the host. The packet receiving circuit or the processing circuit stores the network packets in the storage circuit before the processing circuit issues the interrupt.

20 Claims, 19 Drawing Sheets

(51) Int. Cl.
*H04L 47/62* (2022.01)
*H04L 47/34* (2022.01)

(56) References Cited

U.S. PATENT DOCUMENTS

| | | | |
|---|---|---|---|
| 2004/0049612 A1* | 3/2004 | Boyd | H04L 47/34 |
| | | | 710/52 |
| 2006/0221945 A1* | 10/2006 | Chin | H04L 49/90 |
| | | | 370/381 |
| 2007/0233721 A1* | 10/2007 | Bazar | H04L 49/90 |
| 2008/0259960 A1* | 10/2008 | Favor | H04L 49/90 |
| | | | 370/476 |
| 2016/0154596 A1* | 6/2016 | Willcock | G06F 13/4013 |
| | | | 711/114 |
| 2017/0012906 A1* | 1/2017 | Szilagyi | H04B 1/0483 |
| 2018/0278550 A1* | 9/2018 | Rosen | H04L 47/34 |
| 2020/0112870 A1* | 4/2020 | Wang | H04W 28/0263 |

* cited by examiner

NETWORK INTERFACE DEVICE, ELECTRONIC DEVICE CONTAINING SAME, AND OPERATION METHOD OF THE NETWORK INTERFACE DEVICE

BACKGROUND OF THE INVENTION

1. Field of the Invention

This disclosure generally relates to wireless networks, and, more particularly, to network interface devices and operation methods thereof.

2. Description of Related Art

FIG. 1 is a functional block diagram of a conventional electronic device 10. The electronic device 10 includes a host 110 and a network interface device 120. The host 110 receives network packets via the network interface device 120. The host 110 is a combination of hardware and software and configured to carry out the main functions of the electronic device 10. The network interface device 120 is used to receive network packets and provide the received network packets to the host 110.

When the network packets that the network interface device 120 provides to the host 110 are not arranged in the order in which they were sent (e.g., some network packets were received by the network interface device 120 later due to retransmission), the host 110 must reorder the network packets before processing them (e.g., sending the network packets to the upper layer(s) of the Open System Interconnection Model (OSI model)). However, reordering the network packets, which consumes extra computing power, degrades the performance of the host.

SUMMARY OF THE INVENTION

In view of the issues of the prior art, an object of this disclosure is to provide a network interface device, an electronic device including the network interface device, and an operation method of the network interface device so as to make an improvement to the prior art.

According to one aspect of this disclosure, a network interface device is provided. The network interface device is coupled to a host which includes a storage circuit. The network interface device includes a packet receiving circuit and a processing circuit. The packet receiving circuit is configured to receive multiple network packets. The processing circuit is coupled to the packet receiving circuit and configured to perform the following steps: (A) parsing the network packets to obtain a plurality of sequence numbers of the network packets; (B) reordering the network packets based on the sequence numbers to generate reorder information; (C) appending the reorder information to one of the network packets and generating packet order information, or generating the packet order information containing the reorder information; (D) storing the packet order information in the storage circuit; and (E) issuing an interrupt to the host. The packet receiving circuit or the processing circuit stores the network packets in the storage circuit before the processing circuit issues the interrupt.

According to another aspect of this disclosure, an electronic device that includes a host and a network interface device is provided. The host includes a storage circuit and a processor. The storage circuit is configured to store a buffer list and multiple network packets. The buffer list lists multiple buffer addresses. The processor is configured to generate or update the buffer list. The network interface device is coupled to the host and includes a packet receiving circuit and a processing circuit. The packet receiving circuit is configured to receive the network packets. The processing circuit is coupled to the packet receiving circuit and configured to perform the following steps: (A) parsing the network packets to obtain a plurality of sequence numbers of the network packets; (B) reordering the network packets based on the sequence numbers to generate reorder information; (C) appending the reorder information to one of the network packets and generating packet order information, or generating the packet order information containing the reorder information; (D) storing the packet order information in the storage circuit; and (E) issuing an interrupt to the host. In response to the interrupt, the host reads the packet order information and accesses the storage circuit based on the packet order information to read the network packets.

According to still another aspect of this disclosure, an operation method of a network interface device is provided. The network interface device is coupled to a host that includes a storage circuit. The operation method includes the following steps: receiving a plurality of network packets; parsing the network packets to obtain a plurality of sequence numbers of the network packets; reordering the network packets based on the sequence numbers to generate reorder information; appending the reorder information to one of the network packets and generating packet order information, or generating the packet order information containing the reorder information; storing the network packets in the storage circuit; storing the packet order information in the storage circuit; and issuing an interrupt to the host.

These and other objectives of this disclosure no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a network interface device, an electronic device containing the network interface device, and an operation method of the network interface device. On account of that some or all elements of the network interface device and the electronic device could be known, the detail of such elements is omitted provided that such detail has little to do with the features of this disclosure, and that this omission nowhere dissatisfies the specification and enablement requirements. Some or all of the processes of the operation method of the network interface device may be implemented by software and/or firmware, and can be performed by the network interface device or its equivalent. A person having ordinary skill in the art can choose components or steps equivalent to those described in this specification to carry out this disclosure, which means that the scope of this disclosure is not limited to the embodiments in the specification.

Figure 1:
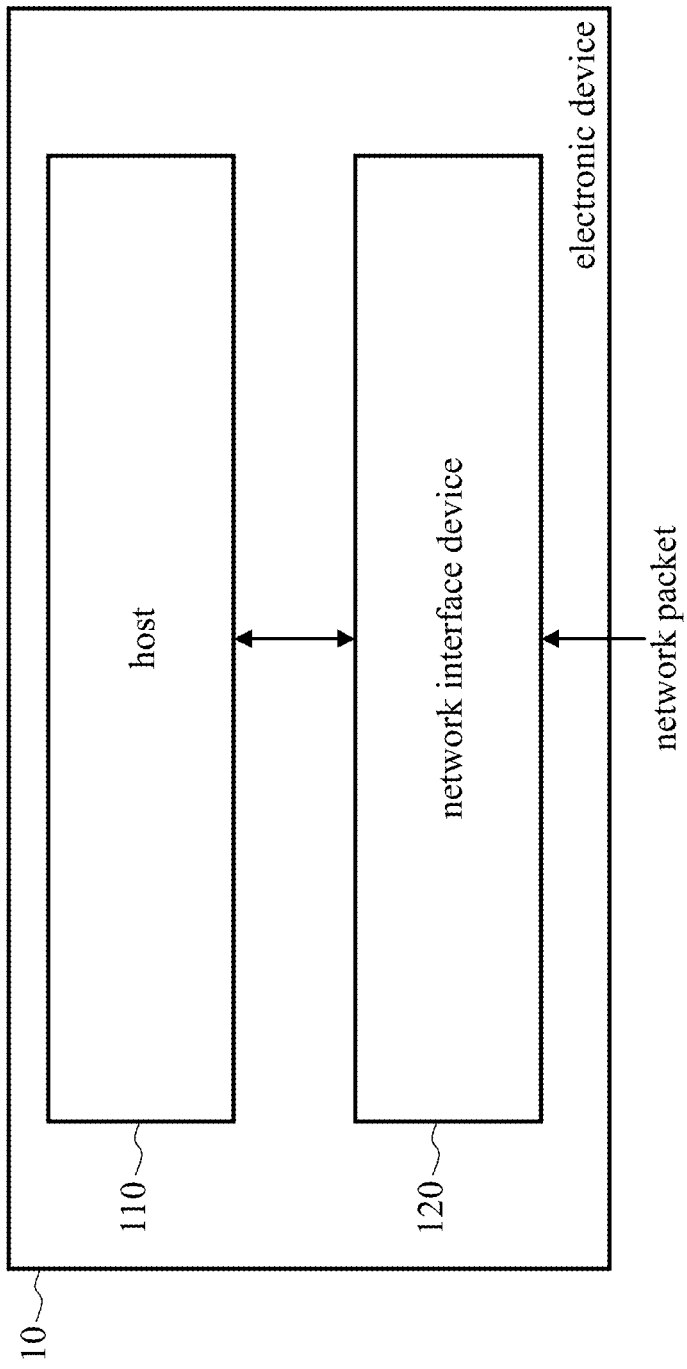
FIG. 1 illustrates a functional block diagram of a conventional electronic device.
Figure 2:
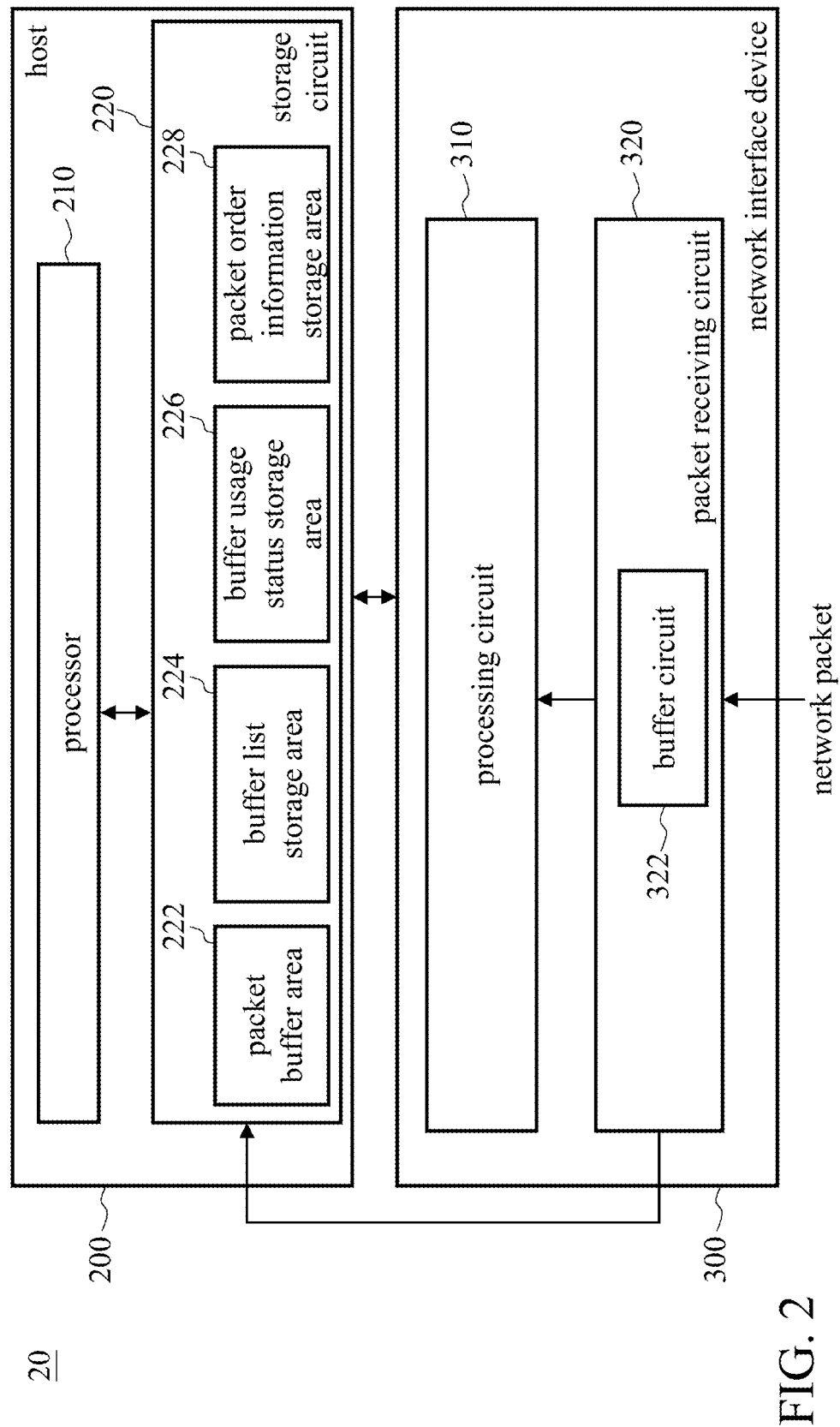
FIG. 2 illustrates a functional block diagram of an electronic device according to an embodiment of this disclosure.

FIG. 2 is a functional block diagram of the electronic device 20 according to an embodiment of this disclosure. The electronic device 20 includes a host 200 and a network interface device 300 that are coupled to each other. For example, the electronic device 20 may be a computer (such as a desktop computer, a notebook, or a tablet), a portable electronic device (such as a notebook, a tablet, or a mobile phone), or a wireless access point (WAP). The network interface device 300 is used to receive network packets, and the host 200 is responsible for processing the network packets. The host 200 includes a processor 210 and a storage circuit 220 (e.g., a dynamic random access memory (DRAM)). The storage circuit 220 includes a packet buffer area 222, a buffer list storage area 224, a buffer usage status storage area 226, and a packet order information storage area 228. The network interface device 300 includes a processing circuit 310 and a packet receiving circuit 320 that are coupled to each other. The packet receiving circuit 320 includes a buffer circuit 322. The network interface device 300 may be a network interface card (NIC) or network interface chip of the electronic device 20. The packet receiving circuit 320 is, for example, a Wifi MAC RX Offload Engine.

The processor 210 and the storage circuit 220 are coupled to each other. The processor 210 may be a circuit or electronic component with program execution capability, such as a central processing unit, a microprocessor, a microprocessing unit, a digital signal processor, or an equivalent thereof. The storage circuit 220 stores a plurality of program codes or program instructions, and the processor 210 carries out the main functions of the electronic device 20 by executing the program codes or program instructions.

Figure 3A:
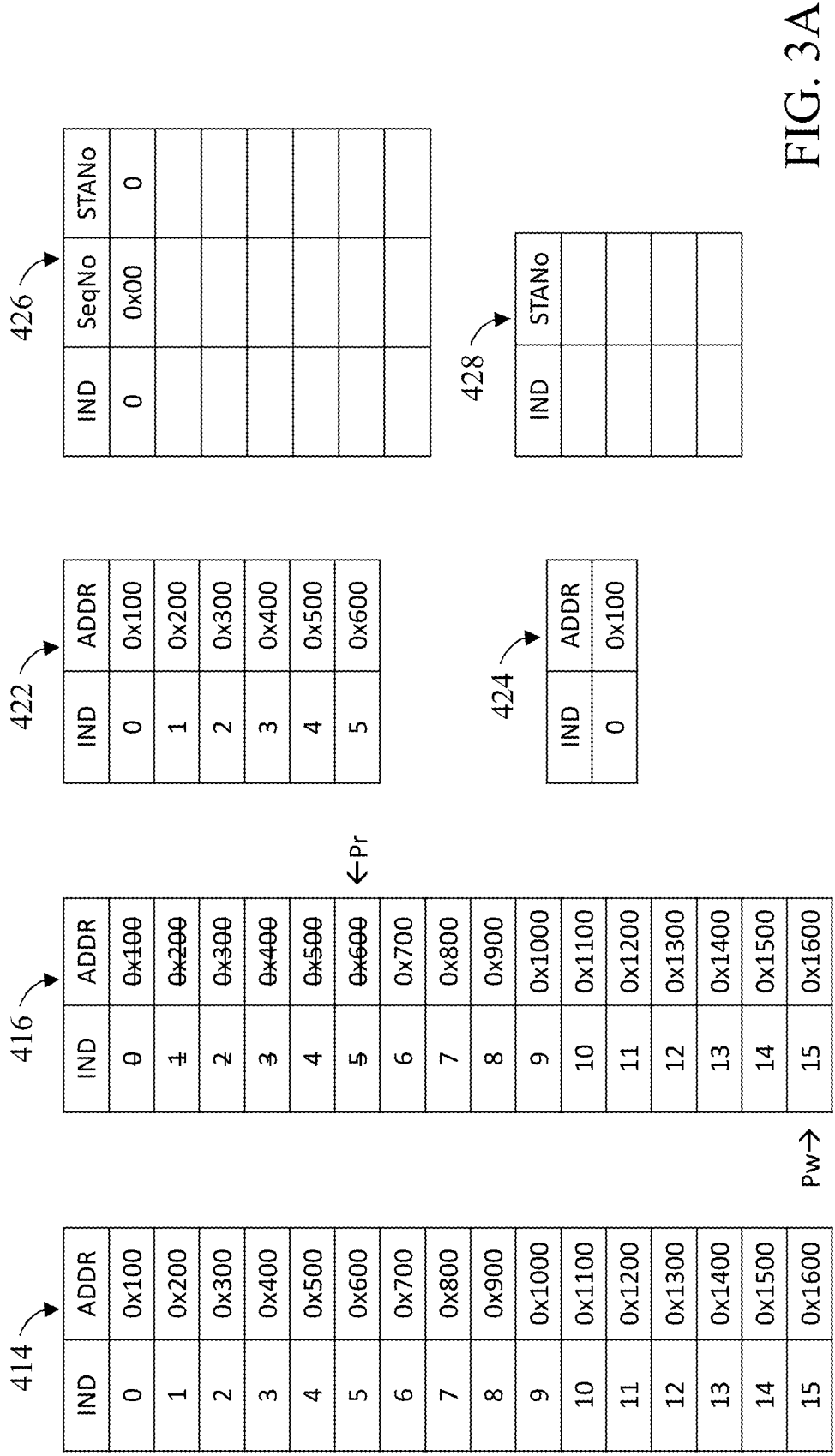
FIGS. 3A to 3J are examples of the packet information and the partial storage content of the storage circuit according to this disclosure.

FIGS. 3A to 3J are examples of the packet information and the partial storage content of the storage circuit 220 according to an aspect of this disclosure. The packet buffer area 222 includes a plurality of packet buffers (e.g., storage space or memory space) for storing the network packets. The buffer list 414 is stored in the buffer list storage area 224, and the addresses of some packet buffers in the packet buffer area 222 are listed in the buffer list 414. The buffer usage status 416 is stored in the buffer usage status storage area 226, and the buffer usage status 416 records the usage status of the packet buffers in the packet buffer area 222. FIGS. 4A to 4B are flowcharts of the operation method of the network interface device according to an embodiment of this disclosure. The operation method includes the following steps.

Step S510: the processor 210 of the host 200 allocates at least one packet buffer in the storage circuit 220 (more specifically, in the packet buffer area 222) and generates a buffer list 414. As shown in FIG. 3A, 16 buffer addresses ADDR=0x100 to 0x1600 (in one-to-one correspondence with indexes IND=0 to 15) are listed in the buffer list 414, and the buffer usage status 416 records the usage status of the packet buffers corresponding to the buffer addresses ADDR listed in the buffer list 414. The write pointer Pw which is controlled by the processor 210 points to the most recently allocated packet buffer, while the read pointer Pr which is controlled by the processing circuit 310 points to the most recently used address.

Step S515: the processor 210 updates the buffer usage status 416. As shown in FIG. 3A, because the processor 210 allocates 16 packet buffers corresponding to indexes IND=0 to 15 in step S510, the write pointer Pw points to index IND=15.

Step S520: the processing circuit 310 of the network interface device 300 copies a portion of the buffer usage status 416 to the reorder buffer 422. As shown in FIG. 3A, the reorder buffer 422 lists six packet buffers corresponding to indexes IND=0 to 5. After the six packet buffers corresponding to indexes IND=0 to 5 are copied to the reorder buffer 422, the processing circuit 310 controls the read pointer Pr to point to index IND=5. Note that the buffer address(es) ADDR in the buffer usage status 416 that has/have been copied to the reorder buffer 422 is/are marked by a strikethrough.

Step S522: the processing circuit 310 of the network interface device 300 determines a current buffer address 424 from the reorder buffer 422. The current buffer address 424 corresponds to one of the packet buffers listed in the buffer list 414. As shown in FIG. 3A, the current buffer address 424 (i.e., the address corresponding to index IND=0 in the buffer list 414) is 0x100.

In some embodiments, the reorder buffer 422 and the current buffer address 424 can be omitted. In this case, the processing circuit 310 directly uses the address that the read pointer Pr points to as the current buffer address 424. In other words, the processing circuit 310 directly determines the current buffer address 424 based on the position of the read pointer Pr.

Step S525: the packet receiving circuit 320 receives the network packet, and stores the received network packet in the buffer circuit 322.

Step S530: the processing circuit 310 parses the network packet to obtain the packet information 426. As shown in FIG. 3A, the packet information 426 records the index IND, the sequence number SeqNo of the packet, and the source device number STANo of the packet. Network packets from the same device (such as a computer or mobile phone) have the same source device number STANo. In the embodiment of FIG. 3A, the sequence number SeqNo of the network packet corresponding to index IND=0 is 0x00 (i.e., the $0^{th}$ packet), and the source device number is STANo=0. In the following discussion, it is assumed that all network packets are from the same device (source device number STANo=0); this is intended to illustrate this disclosure by way of examples, rather than to limit the scope of this disclosure.

Step S535: the processing circuit 310 stores the packet information 426 in a storage circuit (not shown) of the processing circuit 310.

Step S540: the network interface device 300 copies or moves the network packet in the buffer circuit 322 to the packet buffer, which corresponds to the current buffer address 424, in the storage circuit 220 of the host 200. In some embodiments, the packet receiving circuit 320 directly writes the network packet temporarily stored in the buffer circuit 322 to the packet buffer area 222. In other embodiments, the processing circuit 310 reads the network packet from the buffer circuit 322 and then writes the network packet to the packet buffer area 222.

Step S545: the processing circuit 310 of the network interface device 300 updates the buffer usage status 416, the reorder buffer 422, and the current buffer address 424. After the packet buffer of buffer address ADDR=0x100 is used (after it is used to store the network packet in step S540), the processing circuit 310 performs the following operations: (1) reading a buffer address ADDR in the buffer usage status 416 based on the position of the read pointer Pr (i.e., the buffer address ADDR=0x700 corresponding to index IND=6), and then updating the position of the read pointer Pr; (2) removing the used buffer address ADDR (i.e., 0x100) from the reorder buffer 422, and copying the buffer address ADDR that has just been read (i.e., 0x700) to the reorder buffer 422; and (3) updating the current buffer address 424 according to the content of the reorder buffer 422, that is, selecting one of the buffer addresses ADDR (e.g., the smallest buffer address ADDR) from the reorder buffer 422 as the current buffer address 424. The updated buffer usage status 416, reorder buffer 422, and current buffer address 424 are shown in FIG. 3B.

Step S550: the processing circuit 310 determines whether the number of data sets in the packet information 426 reaches the threshold and there are no missing packets. In one example in which the threshold value is assumed to be four, when the number of data sets in the packet information 426 is greater than or equal to four, and the sequence numbers SeqNo in the packet information 426 are consecutive, the processing circuit 310 performs step S560 (FIG. 4B); otherwise, the processing circuit 310 performs step S555.

Step S555: the processing circuit 310 determines whether a preset time has elapsed (i.e., whether a time-out occurs). The processing circuit 310 performs step S555 using a timer or counter. When the result of step S555 is NO, the flow returns to step S522 to proceed to receive the next network packet. When the result of step S555 is YES (i.e., a time-out occurs), the processing circuit 310 performs step S560.

Figure 3B:
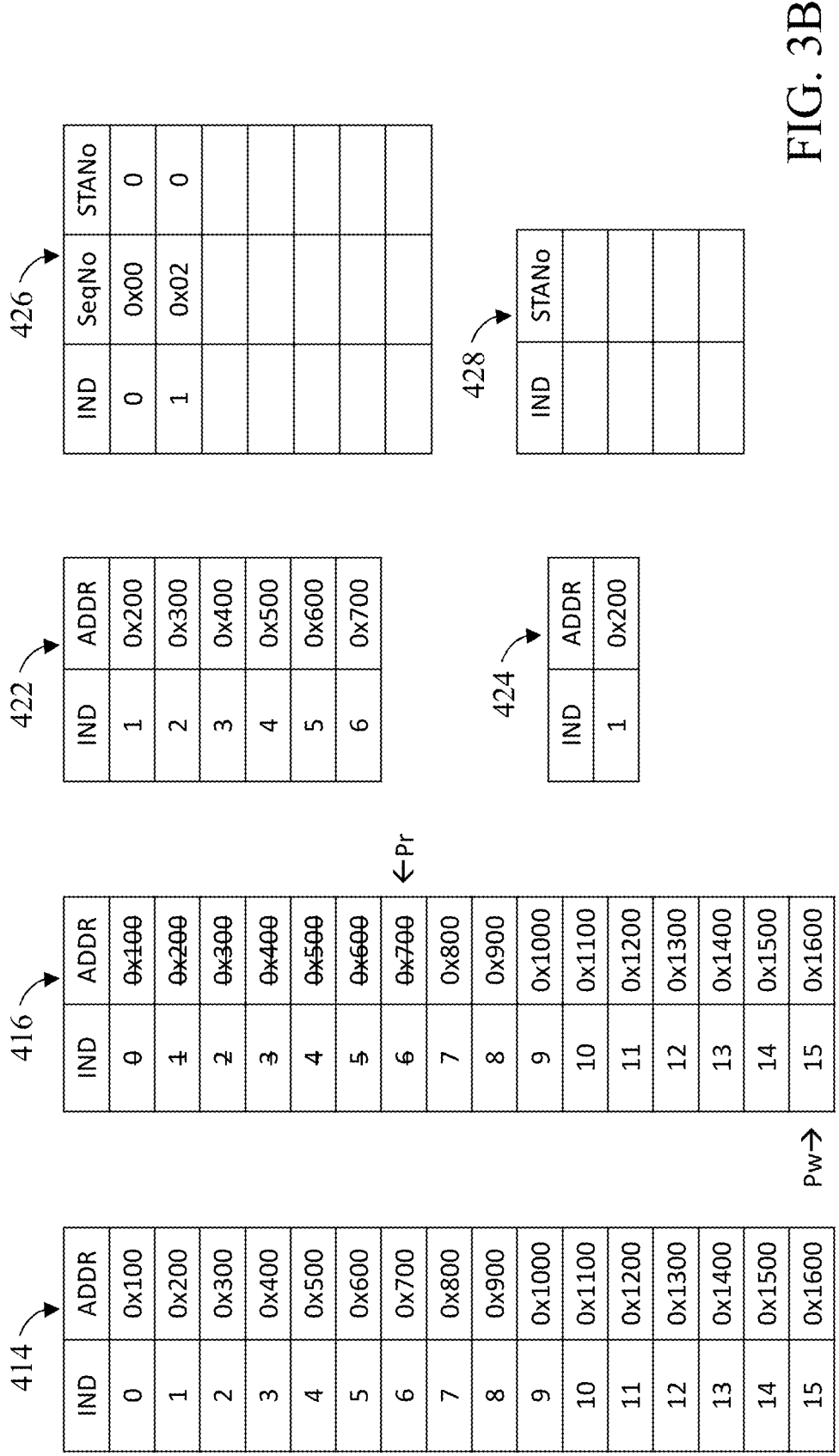
Figure 3C:
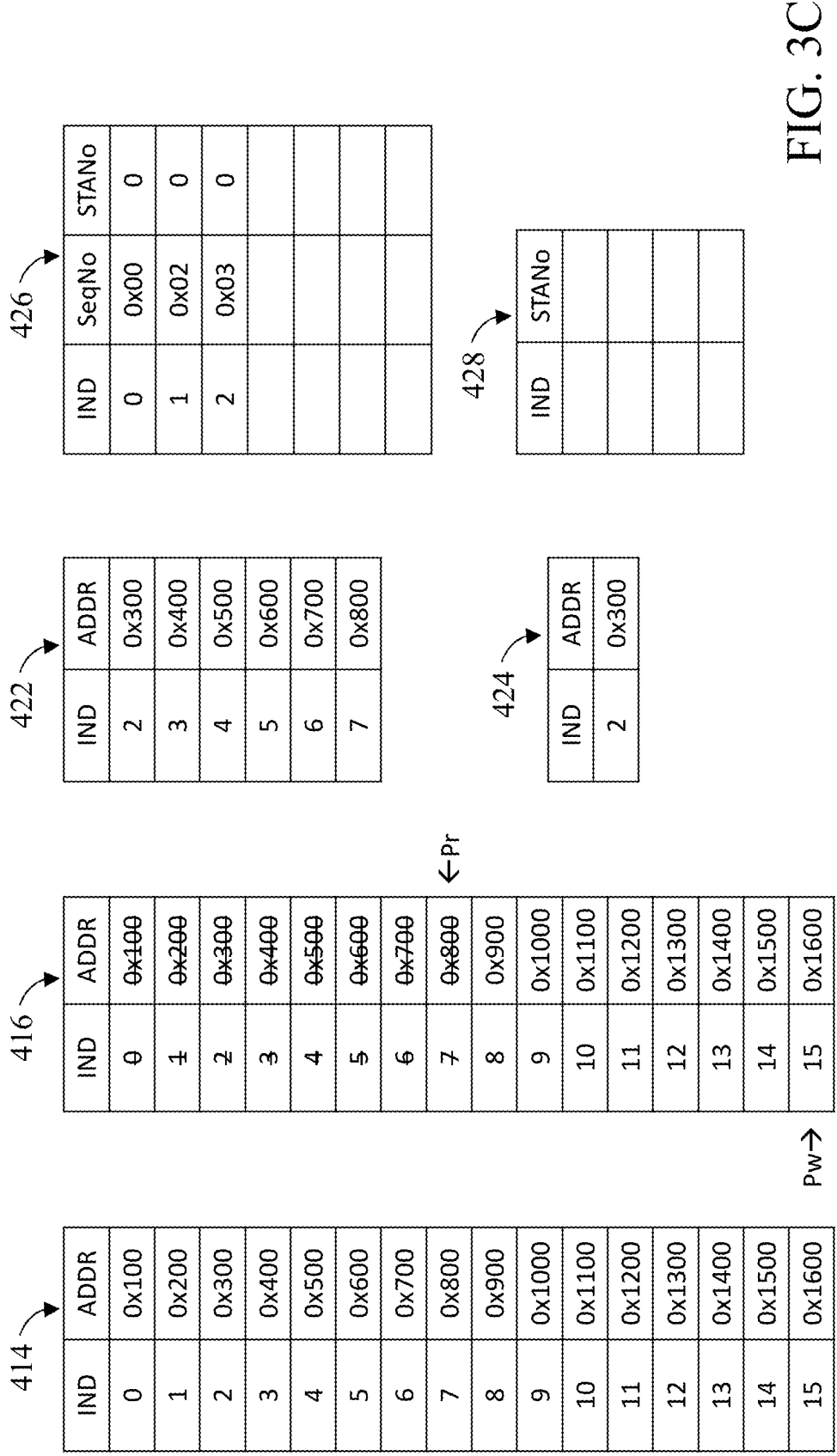
Figure 3D:
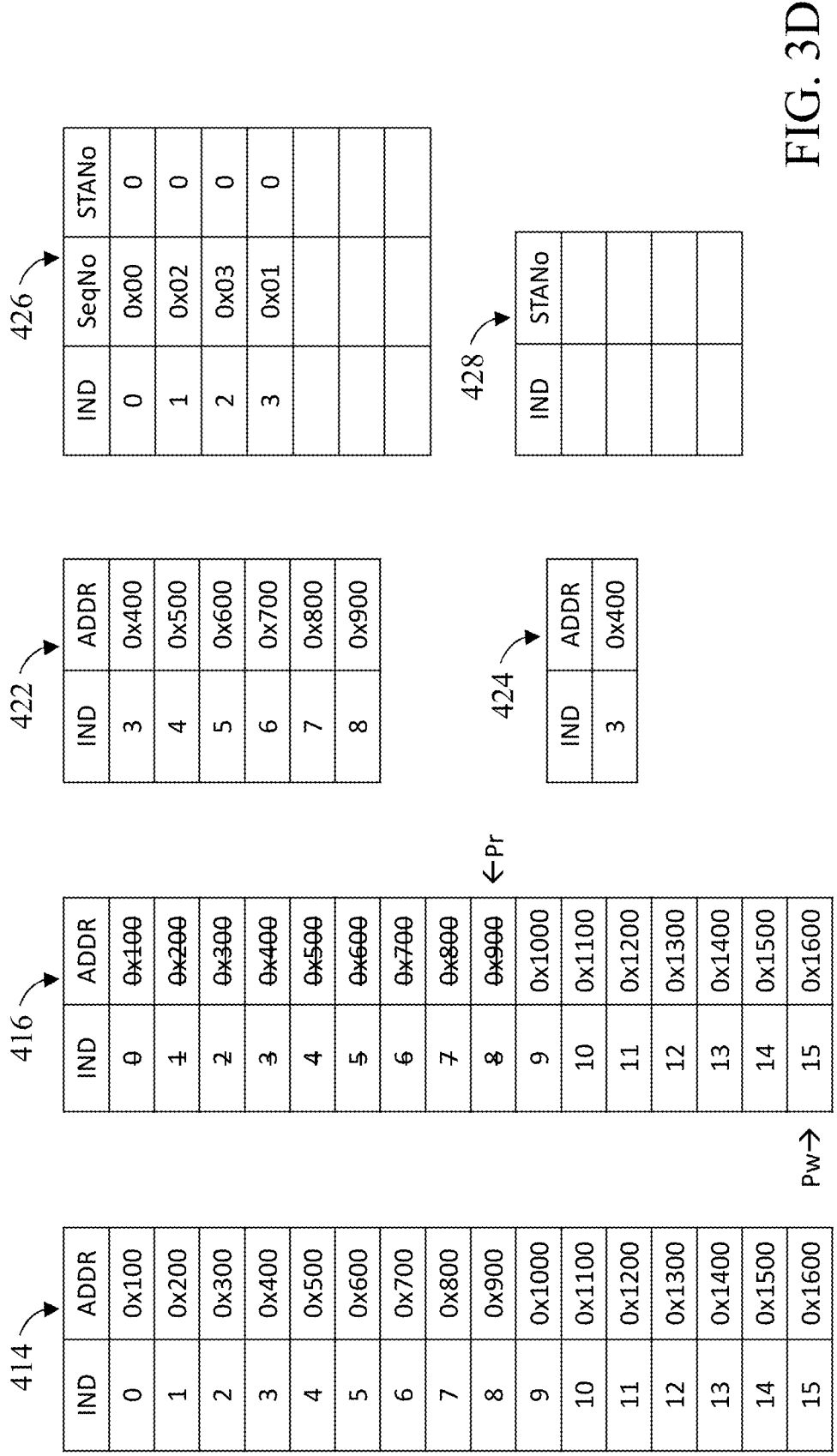
Figure 4A:
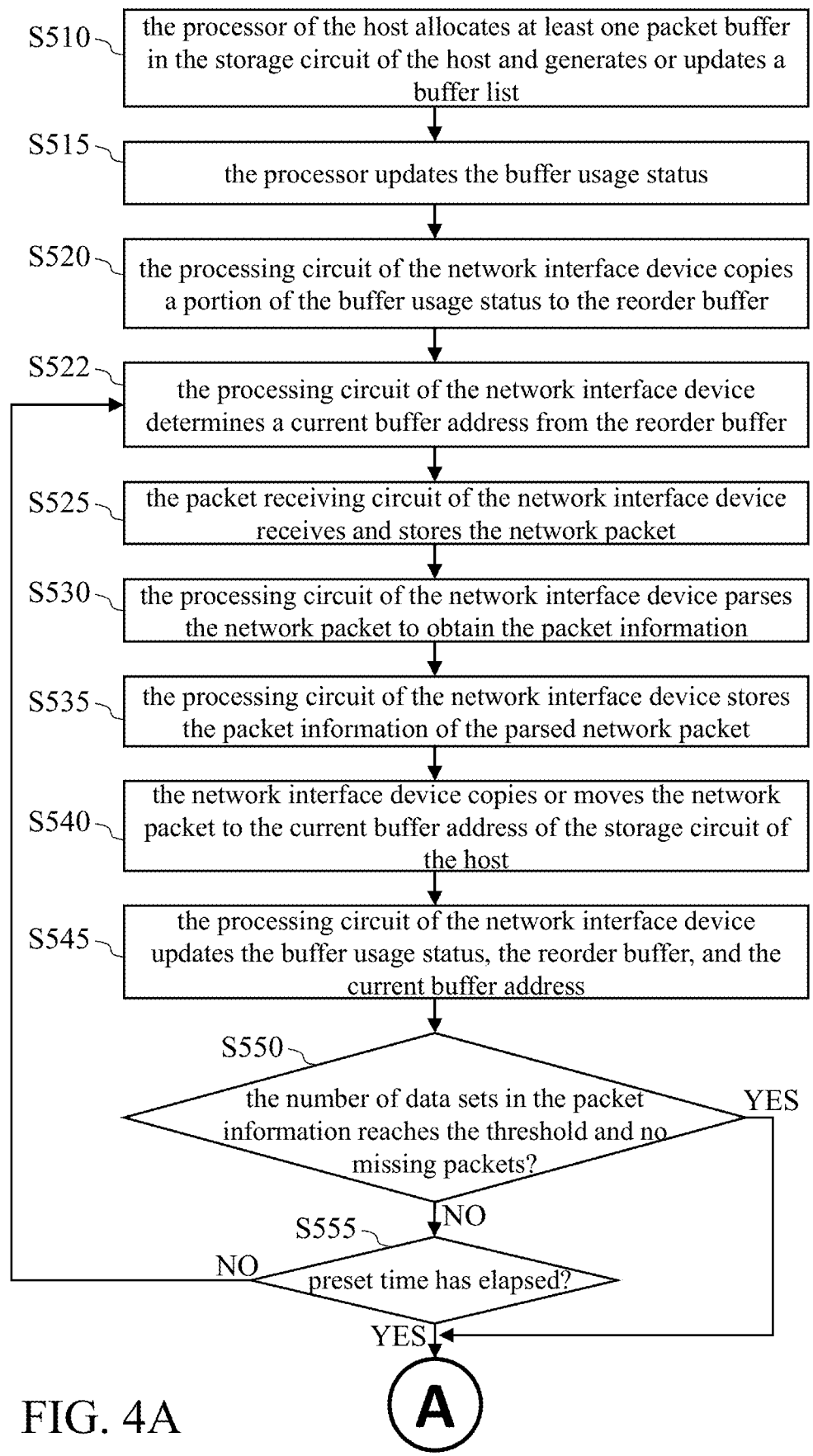
FIGS. 4A to 4B are flowcharts of the operation method of the network interface device according to an embodiment of this disclosure.
Figure 4B:
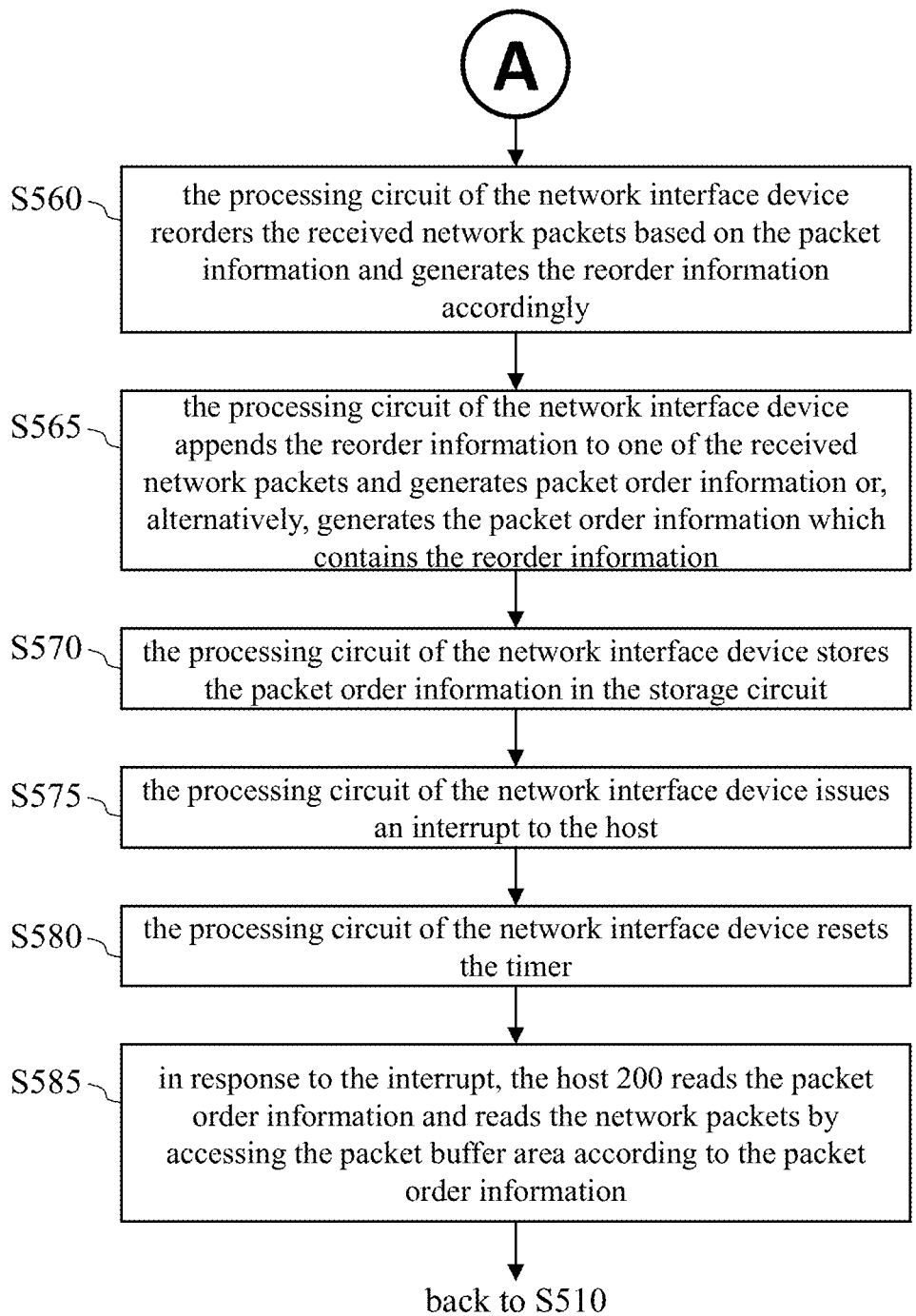

As shown in the packet information 426 of FIG. 3A, since the number of temporarily buffered data sets has not reached the threshold value (which is assumed to be four) and the preset time has not yet elapsed, the processing circuit 310 further executes steps S525 to S555 three times to receive three network packets whose sequence numbers SeqNo are 0x02, 0x03 and 0x01 and which are stored in buffer addresses ADDR=0x200, 0x300, and 0x400, respectively, and the changes of the buffer usage status 416, the reorder buffer 422, the current buffer address 424, and the packet information 426 during this course are shown in FIGS. 3B to 3D. As the case of FIG. 3D, because the number of temporarily buffered data sets has reached the threshold (which is assumed to be four), and there are no missing packets (which means that the sequence numbers SeqNo of the packets in the packet information 426 are consecutive (i.e., 0x00 to 0x03)), the processing circuit 310 determines that the result of step S550 is YES and thus proceeds to perform step S560.

Figure 3E:
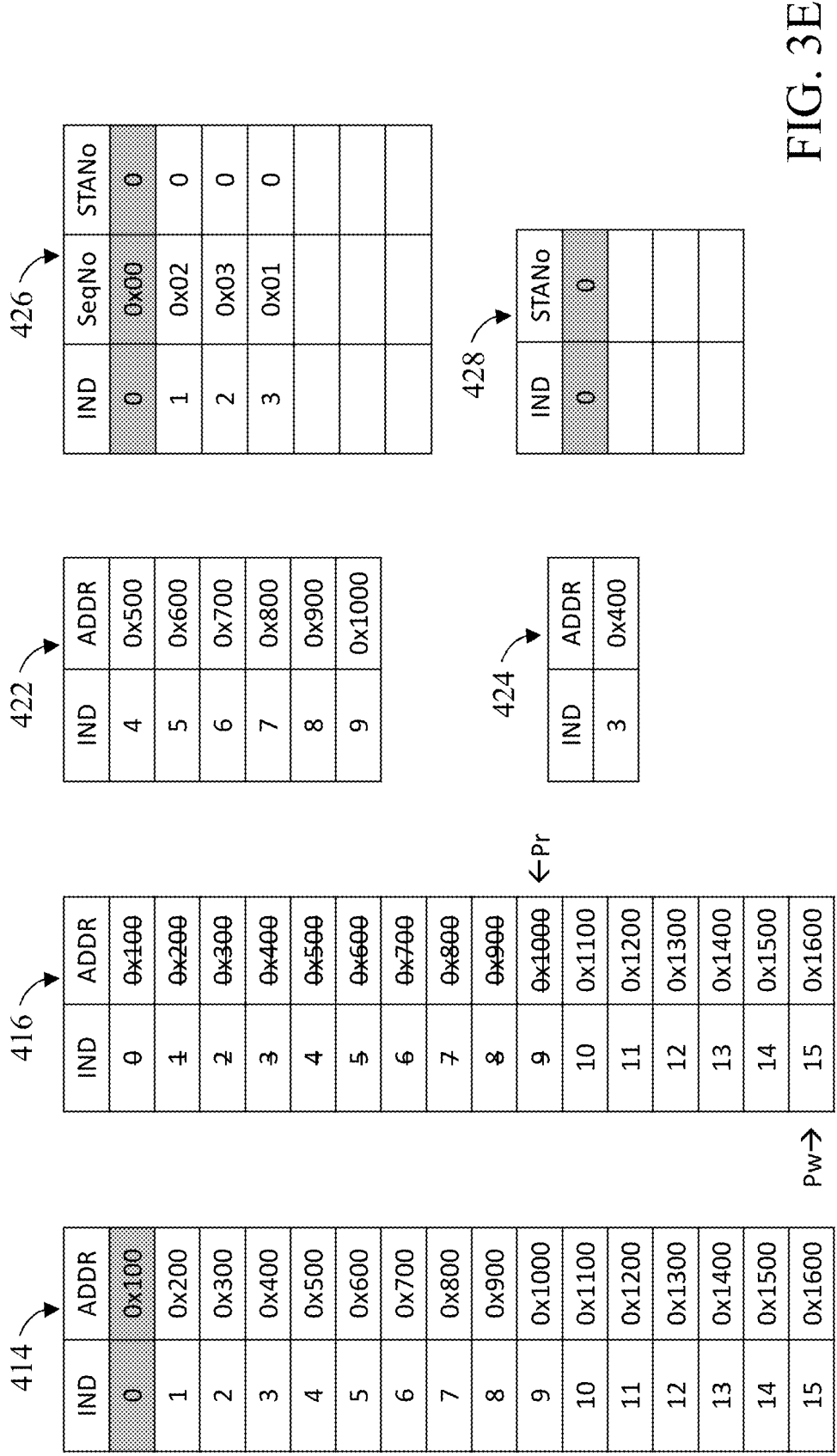

Step S560: the processing circuit 310 of the network interface device 300 reorders the received network packets based on the packet information 426 and generates the reorder information 428 accordingly. Based on any sorting algorithm and the sequence numbers SeqNo, the processing circuit 310 can know that the sequence of the four network packets corresponding to indexes IND=0 to 3 is index IND=0, 3, 1, and 2. In the embodiment of FIG. 3E, the processing circuit 310 records, in the reorder information 428, the index IND (which is "0" in this case) and the source device number STANo (which is "0" in this case) of the network packet of sequence number SeqNo=0x00.

Step S565: the processing circuit 310 of the network interface device 300 appends the reorder information 428 to one of the received network packets and generates packet order information accordingly (the first embodiment) or, alternatively, generates the packet order information which contains the reorder information 428 (the second embodiment).

In the first embodiment, the processing circuit 310 appends the reorder information 428 to one of the network packets listed in the reorder information 428. In the example of FIG. 3E, the processing circuit 310 appends the reorder information 428 to the network packet corresponding to index IND=0 (e.g., to the front or any position of the network packet). In the first embodiment, the packet order information may not contain the reorder information 428. In the first embodiment, the network packet to which the reorder information 428 is appended is stored in the target buffer address, and the packet order information contains the target buffer address and/or the index IND corresponding to the target buffer address. Taking the reorder information 428 in FIG. 3E as an example, the target buffer address is 0x100, so the packet order information contains "0x100" (i.e., storing the buffer address ADDR) and/or "0" (i.e., storing the corresponding index IND).

Step S570: the processing circuit 310 of the network interface device 300 stores the packet order information in the packet order information storage area 228 of the storage circuit 220.

Step S575: the processing circuit 310 of the network interface device 300 issues an interrupt to the host 200 to notify the host 200 that the network packets are ready (which means that the processor 210 can start processing the network packets).

Step S580: the processing circuit 310 of the network interface device 300 resets the timer or counter, for example, resets the timer or counter to zero.

Step S585: in response to the interrupt, the processor 210 of the host 200 reads the packet order information from the packet order information storage area 228 and reads the network packets by accessing the packet buffer area 222 of the storage circuit 220 according to the packet order information.

In the case where the processing circuit 310 performs the first embodiment in step S585, the processor 210, in step S585, first reads the network packet to which the reorder information 428 is appended to obtain the reorder information 428 and then reads other network packets according to the reorder information 428. Taking FIG. 3E as an example, according to the content of the packet order information (e.g., index IND=0 and/or target buffer address=0x100), the processor 210 reads, from the buffer address ADDR=0x100, the network packet to which the reorder information 428 is appended. Because only one network packet is listed in the current reorder information 428 (i.e., the network packet corresponding to the index IND=0), the processor 210 reads only the network packet of buffer address ADDR=0x100 in step S585 this time.

Alternatively, in the case where the processing circuit 310 performs the second embodiment in step S585, the processor 210, in step S585, can immediately obtain the reorder information 428 after reading the packet order information and then read the network packet(s) based on the reorder information 428.

The flow of FIGS. 4A and 4B is further discussed below in connection with the examples shown in FIGS. 3F to 3J which follow FIG. 3E.

Figure 3F:
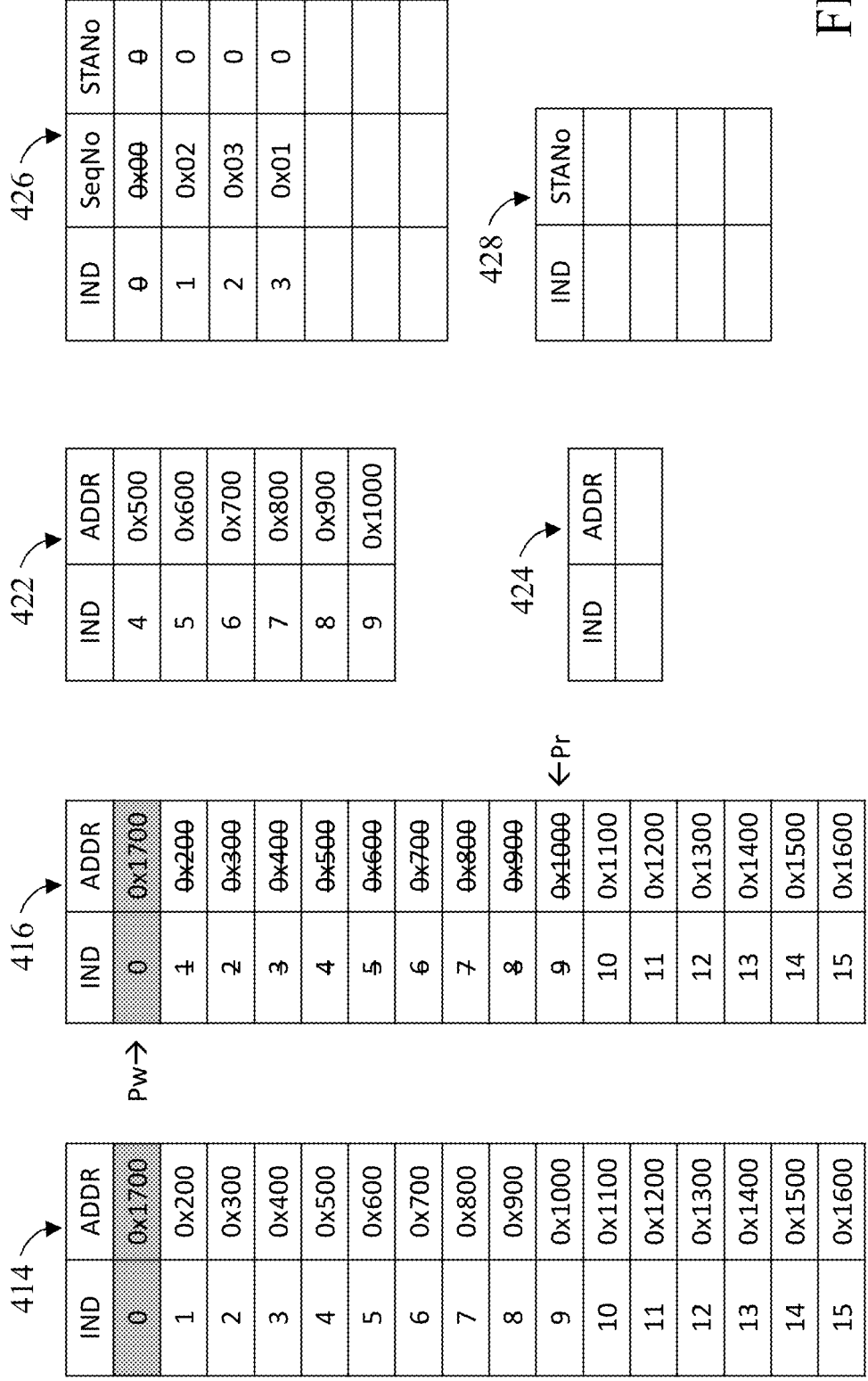

As shown in FIG. 3F, the processor 210 allocates a packet buffer of buffer address ADDR=0x1700 in the packet buffer area 222 and updates the buffer list 414 (updating the buffer address ADDR corresponding to index IND=0 to 0x1700) (step S510), and then updates the buffer usage status 416 by controlling the write pointer Pw to move to the first row and writing "0" and "0x1700" in the index IND column and the buffer address ADDR column, respectively (step S515).

Figure 3G:
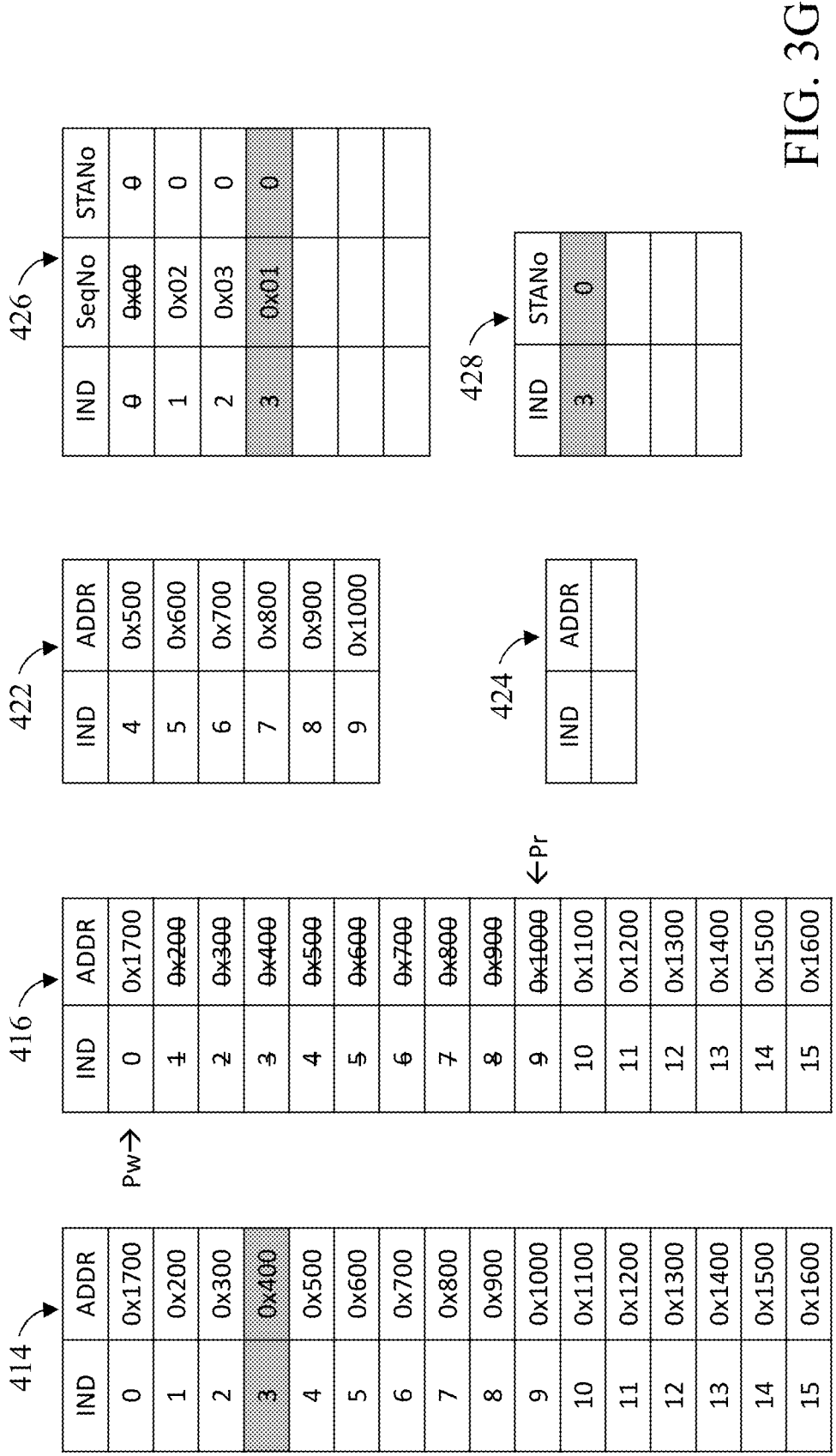

As shown in FIG. 3G, the processing circuit 310 generates the reorder information 428 according to the packet information 426 (i.e., determining the next one or more indexes IND or buffer addresses ADDR according to the sequence number SeqNo) (step S560), appending the reorder information 428 to the network packet corresponding to index IND=3 (i.e., the network packet stored in the buffer address ADDR=0x400) (step S565), storing the packet order information (which indicates index IND=3 and/or target buffer address=0x400) in the packet order information storage area 228 of the storage circuit 220 (step S570), and issues an interrupt (step S575). Then, the processor 210 performs step S585 to read the packet order information and read the network packet stored in the buffer address ADDR=0x400 based on the packet order information.

Figure 3H:
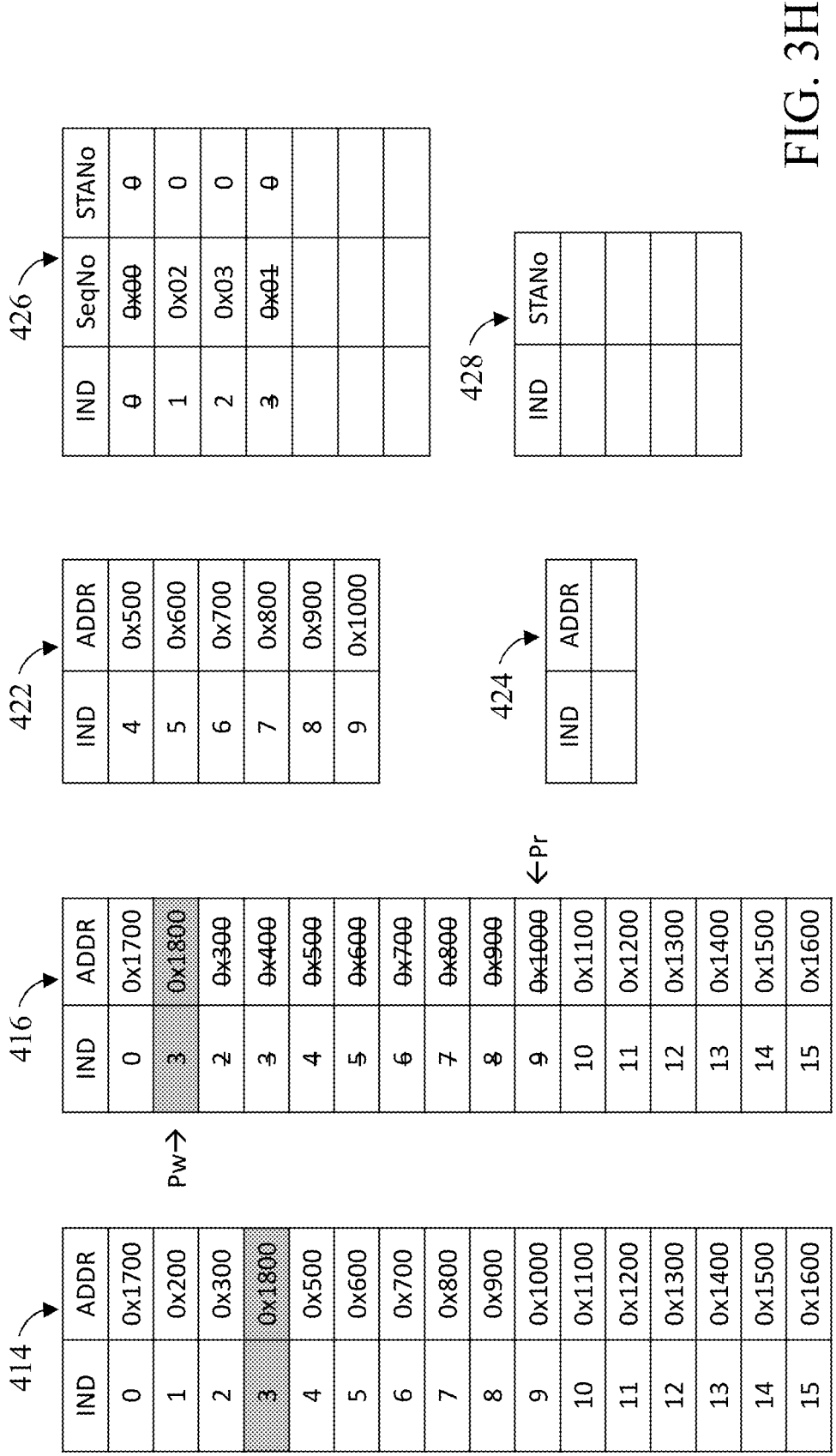

As shown in FIG. 3H, the processor 210 allocates a packet buffer of buffer address ADDR=0x1800 in the packet buffer area 222 and updates the buffer list 414 (updating the buffer address ADDR corresponding to index IND=3 to 0x1800) (step S510), and then updates the buffer usage status 416 by controlling the write pointer Pw to move to the next row and writing "3" and "0x1800" in the index IND column and the buffer address ADDR column, respectively (step S515).

Figure 3I:
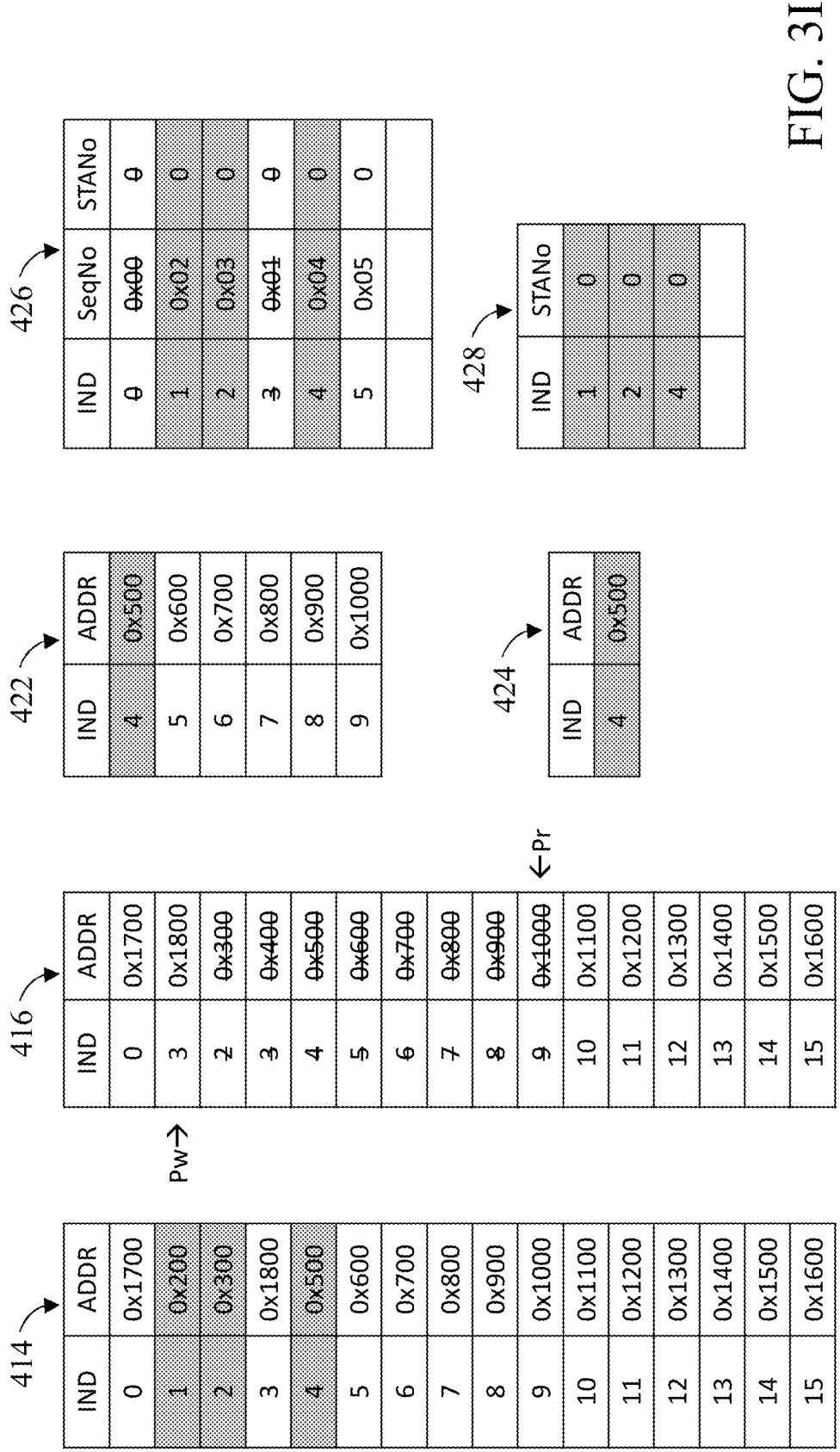

As shown in FIG. 3I, on the one hand, the processing circuit 310 of the network interface device 300 performs steps S522 to S555 twice to receive two network packets corresponding to indexes IND=4 and 5, and then generates the reorder information 428 based on the packet information 426 (step S560), appends the reorder information 428 to the network packet corresponding to index IND=1, 2 or 4 (step S565), stores the packet order information in the packet order information storage area 228 of the storage circuit 220 (specifically, if the processing circuit 310 appends the reorder information 428 to the packet of index IND=1, the target buffer address is 0x200, which corresponds to index IND=1; if the processing circuit 310 appends the reorder information 428 to the packet of index IND=2, the target buffer address is 0x300, which corresponds to index IND=2; and if the processing circuit 310 appends the reorder information 428 to the packet of index IND=4, the target buffer address is 0x500, which corresponds to index IND=4) (step S570), and issues an interrupt (step S575).

Reference is still made to FIG. 3I. On the other hand, in response to the interrupt, the processor 210 performs step S585 to read the packet order information and reads, based on the packet order information, the network packets stored in the buffer address ADDR=0x200, 0x300, or 0x500. In the example of FIG. 3I, since the reorder information 428 includes three indexes IND, the processor 210 proceeds to read the other two network packets based on the reorder information 428 after reading the network packet stored in the target buffer address. For example, when the processing circuit 310 appends the reorder information 428 to the network packet of index IND=1, the processor 210 obtains the reorder information 428 after reading the network packet from the buffer address ADDR=0x200 and then proceeds to read the network packets from the buffer addresses ADDR=0x300 and 0x500 based on the reorder information 428.

Figure 3J:
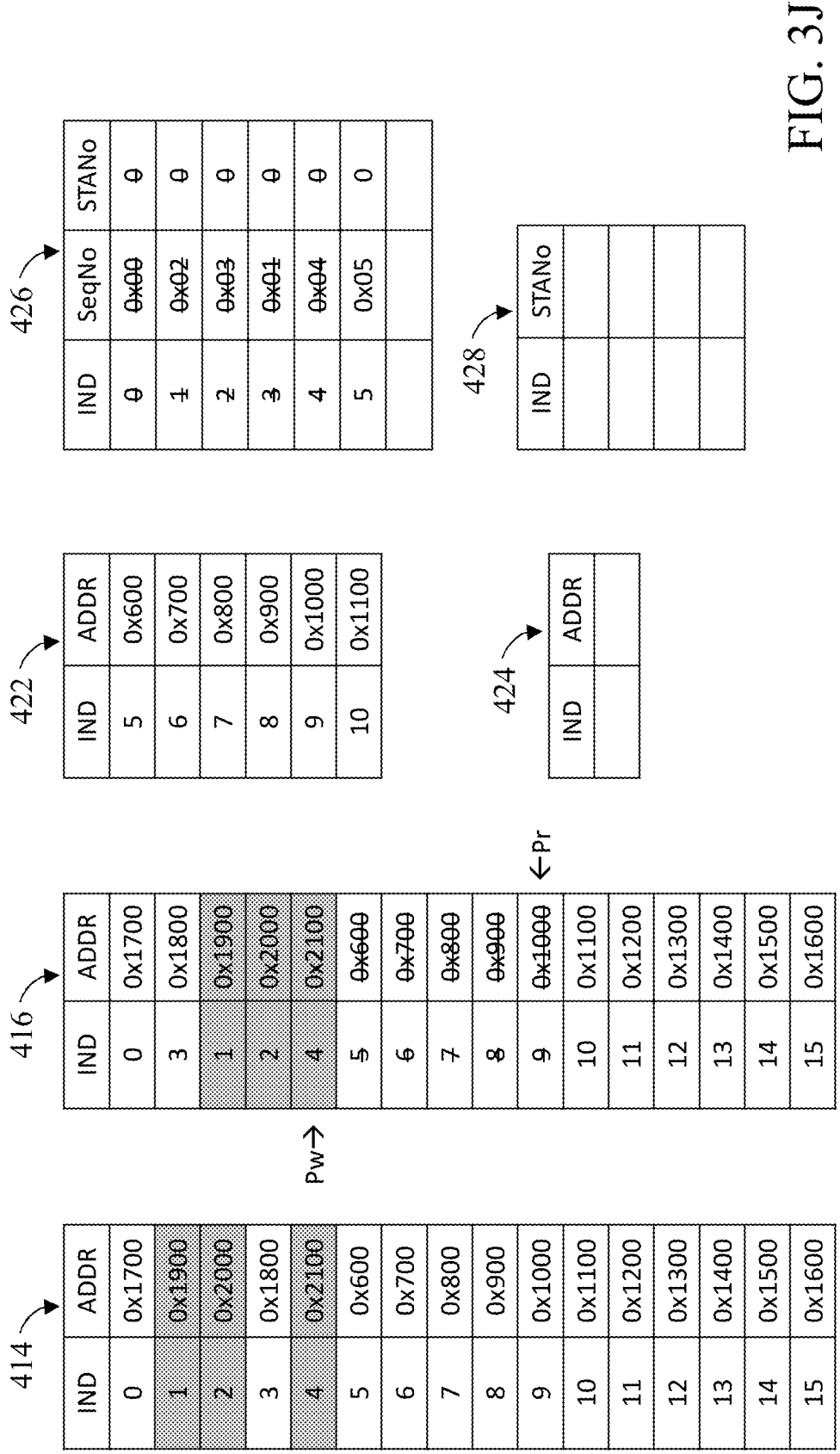

As shown in FIG. 3J, on the one hand, the processing circuit 310 of the network interface device 300 copies a portion of the buffer usage status 416 (i.e., index IND=10, buffer address ADDR=0x1100) to the reorder buffer 422 (step S520); on the other hand, the processor 210 allocates three packet buffers in the packet buffer area 222 (because the processor 210 read three network packets corresponding to indexes IND=1, 2, and 4 in the previous step S585) and updates the buffer list 414 by changing the buffer addresses ADDR corresponding to indexes IND=1, 2, and 4 to "0x1900," "0x2000," and "0x2100," respectively (step S510), and then updates the buffer usage status 416 by controlling the write pointer Pw to move down three rows, which are respectively written "1," "2," and "4" in the index IND column and "0x1900," "0x2000," and "0x2100" in the buffer address ADDR column (step S515).

By repeating the steps of FIG. 4A and FIG. 4B, the electronic device 20 can receive and process more network packets.

Figure 5:
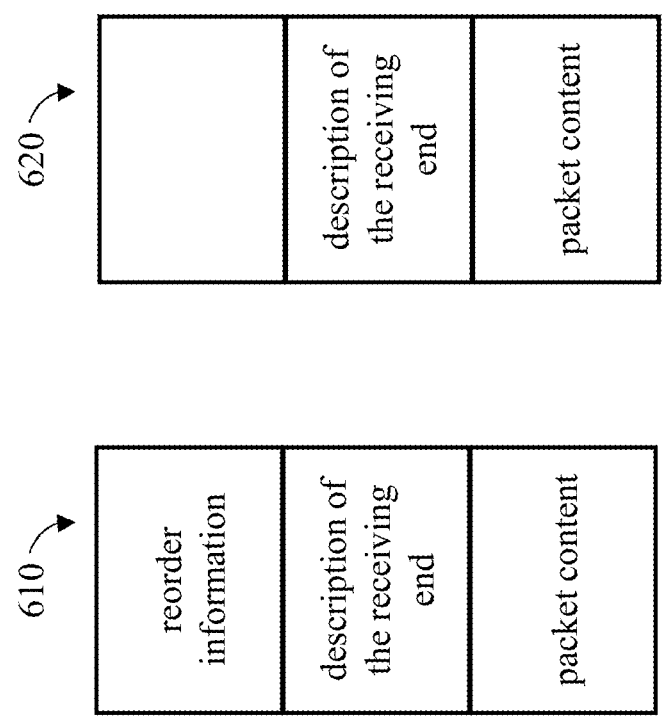
FIG. 5 illustrates a schematic diagram of the data arrangement of the network packet according to an embodiment of this disclosure.

FIG. 5 shows a schematic diagram of the data arrangement of the network packet according to an embodiment of this disclosure. The network packet 610 is a network packet to which the reorder information is appended, while the network packet 620 is a network packet without reorder information appended. In this example, the reorder information is arranged at the head part of the network packet. However, the reorder information can also be arranged at the middle or end of the network packet.

Figure 6:
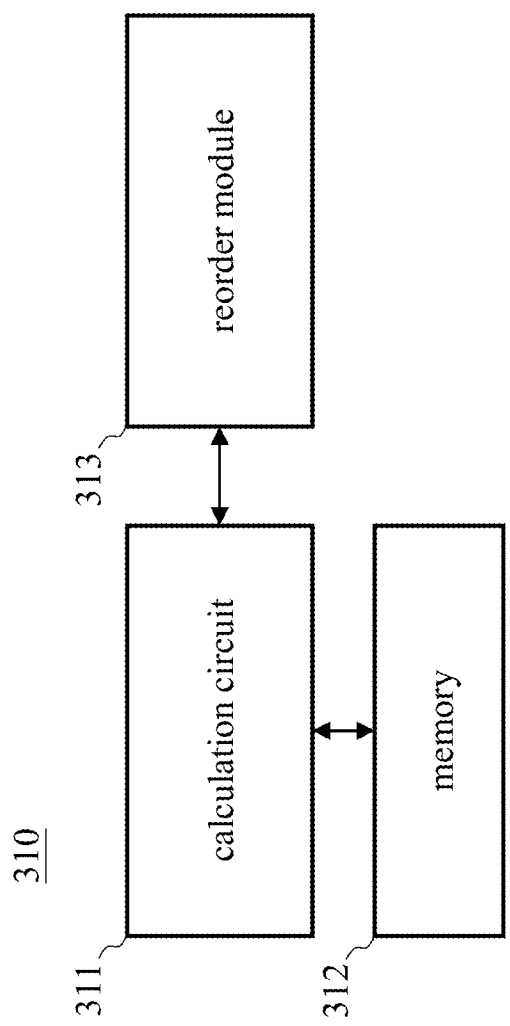
FIG. 6 illustrates a functional block diagram of the processing circuit of the network interface device according to an embodiment of this disclosure.

FIG. 6 shows a functional block diagram of the processing circuit 310 of the network interface device 300 according to an embodiment of this disclosure. The processing circuit 310 includes a calculation circuit 311, a memory 312, and a reorder module 313. The calculation circuit 311 may be a circuit or electronic component with program execution capability, such as a central processing unit, a microprocessor, a micro-processing unit, a digital signal processor, or an equivalent thereof. The memory 312 stores a plurality of program codes or program instructions, and the calculation circuit 311 carries out some of the functions of the processing circuit 310 by executing the program codes or program instructions.

In some embodiments, the reorder module 313 is used to perform step S530 and update the buffer usage status 416 (i.e., part of step S545), and the calculation circuit 311 performs steps S520, S522, S535, S540, S550, S555, S560, S565, S570, S575, S580, and part of step S545.

In some embodiments, after obtaining the reorder information 428 (step S560), the calculation circuit 311 provides the reorder information 428 to the reorder module 313, and then the reorder module 313 performs steps S565, S570, and S575.

In some embodiments, the reorder module 313 may be embodied by a circuit (e.g., a logic circuit). People having ordinary skill in the art can implement the reorder module 313 based on the above discussions, and the details are thus omitted for brevity.

Figure 7:
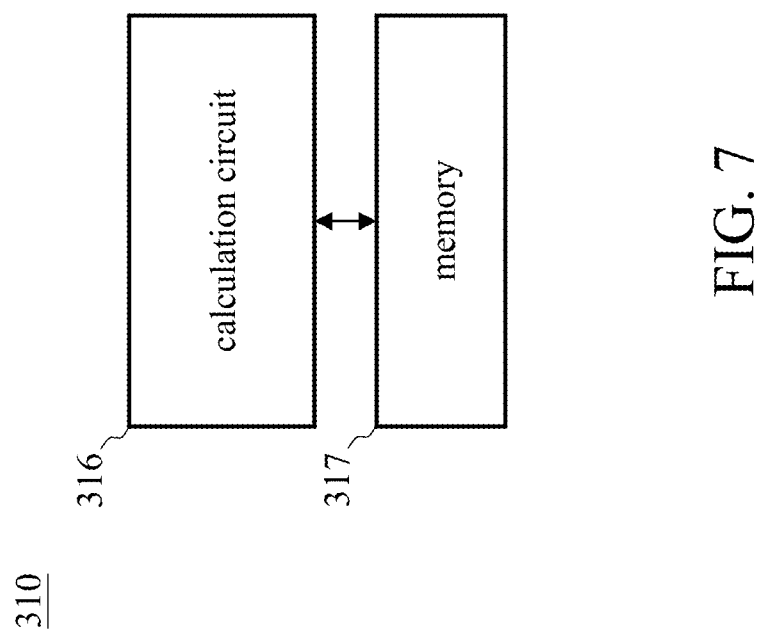
FIG. 7 illustrates a functional block diagram of the processing circuit of the network interface device according to another embodiment of this disclosure.

FIG. 7 shows a functional block diagram of the processing circuit 310 of the network interface device 300 according to another embodiment of this disclosure. The processing circuit 310 includes a calculation circuit 316 and a memory 317. The calculation circuit 316 may be a circuit or electronic component with program execution capability, such as a central processing unit, a microprocessor, a micro-processing unit, a digital signal processor, or an equivalent thereof. The memory 317 stores a plurality of program codes or program instructions, and the calculation circuit 316 carries out the functions of the processing circuit 310 by executing the program codes or program instructions.

Figure 8:
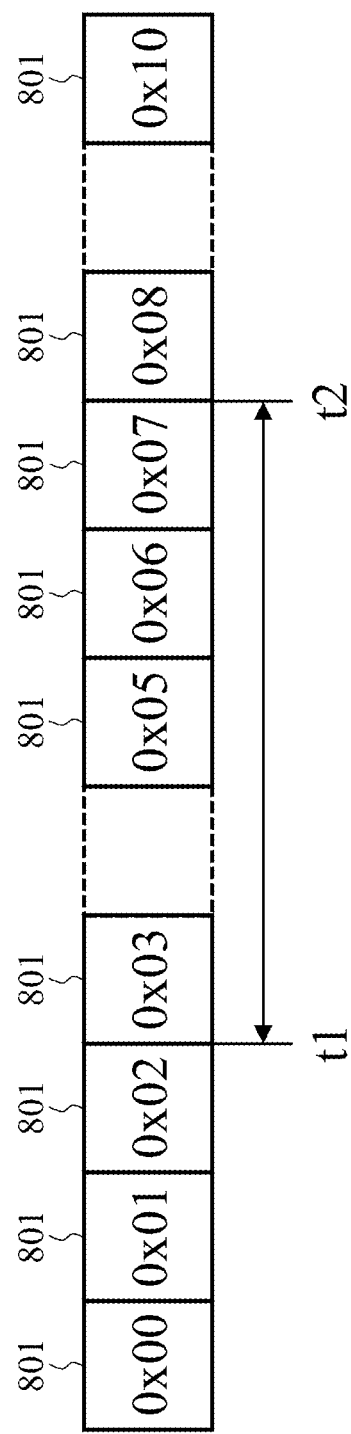
FIG. 8 illustrates multiple network packets and the time points at which interrupts are generated.

Regarding step S555, further discussions are made below in connection with FIG. 8. FIG. 8 shows that nine network packets 801 (whose sequence numbers SeqNo are 0x00 to 0x03, 0x05 to 0x08 and 0x10) are present and that the network packets whose sequence numbers SeqNo are 0x04 and 0x09 are missing. The calculation circuit 311 has issued an interrupt at time point t1 before repeatedly performing steps S522 to S555 until a time-out occurs at time point t2 (i.e., the result of step S555 is YES). Between time points t1 and t2, the network interface device 300 receives a total of four network packets 801 whose sequence numbers SeqNo are 0x03, 0x05, 0x06, and 0x07 but fails to receive the network packet whose sequence number SeqNo is 0x04. Since the time-out occurs, despite network packet loss, the network interface device 300 performs step S560 anyway to generate the reorder information 428 and performs step S575 to issue an interrupt at time point t2. In the next step S585, in response to the interrupt, the processor 210 reads the four network packets whose sequence numbers SeqNo are 0x03, 0x05, 0x06, and 0x07 from the storage circuit 220. However, because there is a network packet missing, the reorder information 428 indicates the network packets whose sequence numbers SeqNo are not consecutive, that is, indicating the four network packets whose sequence numbers SeqNo are 0x03, 0x05, 0x06, and 0x07.

Figure 9:
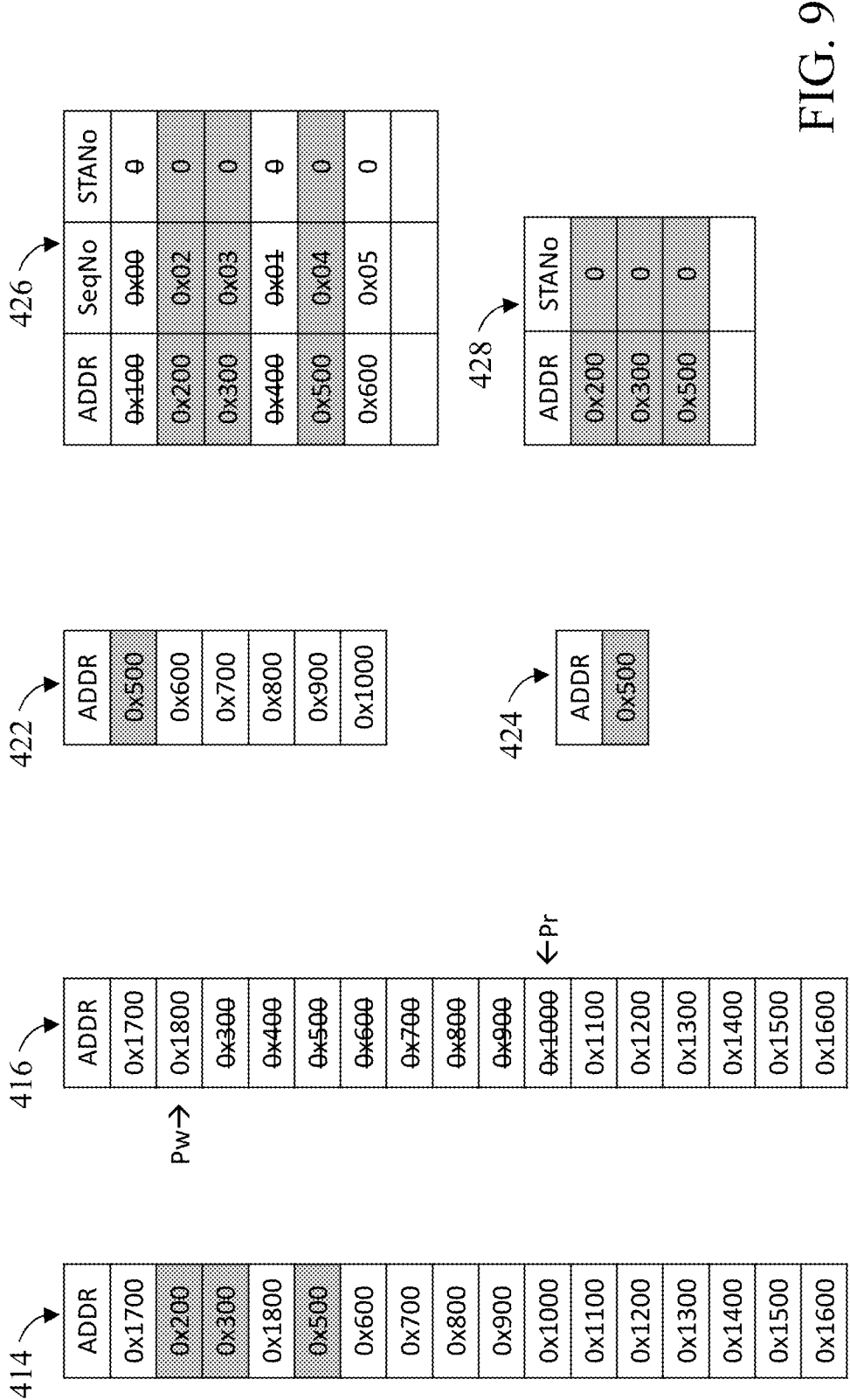
FIG. 9 illustrates another example of the packet information and the partial storage content of the storage circuit according to this disclosure.

In some embodiments, the buffer list 414, buffer usage status 416, reorder buffer 422, current buffer address 424, packet information 426, and reorder information 428 include the buffer address ADDR but not the index IND, or use corresponding buffer address(es) ADDR to replace the index (es) IND. In this instance, the content of FIG. 3I becomes the content shown in FIG. 9, and any information associated with the index IND in the foregoing operations is replaced with the corresponding buffer address ADDR.

In summary, the network interface device 300 of this disclosure has the capability of reordering the network packets, saving the computing resources of the host 200 which are otherwise used to reorder the network packets. Furthermore, because the network interface device 300 stores the network packets in the storage circuit 220 of the host 200, the network interface device 300 can save the amount of memory (e.g., the buffer circuit 322).

Various functional components or blocks have been described herein. As appreciated by persons skilled in the art, in some embodiments, the functional blocks can preferably be implemented through circuits (either dedicated circuits, or general purpose circuits, which operate under the control of one or more processors and coded instructions), which typically comprise transistors or other circuit elements that are configured in such a way as to control the operation of the circuitry in accordance with the functions and operations described herein. As further appreciated by persons skilled in the art, the specific structure or interconnections of the circuit elements can typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Please note that there is no step sequence limitation for the method embodiments as long as the execution of each step is applicable. Furthermore, the shape, size, and ratio of any element and the step sequence of any flowchart in the disclosed figures are exemplary for understanding, not for limiting the scope of this disclosure.

The aforementioned descriptions represent merely the preferred embodiments of this disclosure, without any intention to limit the scope of this disclosure thereto. Various equivalent changes, alterations, or modifications based on the claims of this disclosure are all consequently viewed as being embraced by the scope of this disclosure.

What is claimed is:

1. A network interface device, wherein the network interface device is coupled to a host, and the host comprises a storage circuit, the network interface device comprising:
   a packet receiving circuit for receiving a plurality of network packets; and
   a processing circuit, coupled to the packet receiving circuit and configured to perform following steps:
   (A) parsing the network packets to obtain a plurality of sequence numbers of the network packets;
   (B) reordering the network packets based on the sequence numbers to generate reorder information;
   (C) appending the reorder information to one of the network packets and generating packet order information, or generating the packet order information containing the reorder information;
   (D) storing the packet order information in the storage circuit; and
   (E) issuing an interrupt to the host;
   wherein the packet receiving circuit or the processing circuit stores the network packets in the storage circuit before the processing circuit issues the interrupt.

2. The network interface device of claim 1, wherein the storage circuit stores a buffer list and a buffer usage status, the buffer list lists a plurality of buffer addresses, and the buffer usage status records a usage status of a plurality of buffers corresponding to the buffer addresses.

3. The network interface device of claim 2, wherein the network interface device stores the network packets in the storage circuit based on the buffer usage status, and the processing circuit comprises:
   a reorder module, coupled to the packet receiving circuit and configured to perform step (A) and update the buffer usage status;
   a memory configured to store a plurality of program instructions or program codes; and
   a calculation circuit, coupled to the reorder module and the memory and configured to execute the program instructions or program codes to perform steps (B) to (E).

4. The network interface device of claim 2, wherein the reorder information comprises at least one of the buffer addresses.

5. The network interface device of claim 2, wherein the buffer list comprises a plurality of indexes corresponding to the buffer addresses, and the reorder information comprises the index(es) corresponding to at least one of the buffer addresses.

6. The network interface device of claim 2, wherein when the reorder information is appended to one of the network packets, the packet order information comprises a target buffer address or an index corresponding to the target buffer address, and the network packet to which the reorder information is appended is stored in the target buffer address.

7. The network interface device of claim 1, wherein when the reorder information is appended to one of the network packets, the packet order information does not contain the reorder information.

8. The network interface device of claim 1, wherein the processing circuit further performs following step:
(F) performing steps (B) to (E) when a time-out occurs, wherein the reorder information indicates the network packets whose sequence numbers are not consecutive.

9. An electronic device, comprising:
a host, comprising:
a storage circuit for storing a buffer list and a plurality of network packets, wherein the buffer list lists a plurality of buffer addresses; and
a processor for generating or updating the buffer list; and
a network interface device, coupled to the host and comprising:
a packet receiving circuit for receiving the network packets; and
a processing circuit, coupled to the packet receiving circuit and configured to perform following steps:
(A) parsing the network packets to obtain a plurality of sequence numbers of the network packets;
(B) reordering the network packets based on the sequence numbers to generate reorder information;
(C) appending the reorder information to one of the network packets and generating packet order information, or generating the packet order information containing the reorder information;
(D) storing the packet order information in the storage circuit; and
(E) issuing an interrupt to the host;
wherein in response to the interrupt, the host reads the packet order information and accesses the storage circuit based on the packet order information to read the network packets.

10. The electronic device of claim 9, wherein the storage circuit further stores a buffer usage status which records a usage status of a plurality of buffers corresponding to the buffer addresses.

11. The electronic device of claim 10, wherein the host further allocates a packet buffer after reading the network packets and updates the buffer list and the buffer usage status based on the buffer address of the packet buffer.

12. The electronic device of claim 10, wherein the network interface device stores the network packets in the storage circuit based on the buffer usage status, and the processing circuit comprises:
a reorder module, coupled to the packet receiving circuit and configured to perform step (A) and update the buffer usage status;
a memory configured to store a plurality of program instructions or program codes; and
a calculation circuit, coupled to the reorder module and the memory and configured to execute the program instructions or program codes to perform steps (B) to (E).

13. The electronic device of claim 10, wherein the reorder information comprises at least one of the buffer addresses.

14. The electronic device of claim 10, wherein the buffer list comprises a plurality of indexes corresponding to the buffer addresses, and the reorder information comprises the index(es) corresponding to at least one of the buffer addresses.

15. The electronic device of claim 10, wherein when the reorder information is appended to one of the network packets, the packet order information comprises a target buffer address or an index corresponding to the target buffer address, and the network packet to which the reorder information is appended is stored in the target buffer address.

16. The electronic device of claim 9, wherein when the reorder information is appended to one of the network packets, the packet order information does not contain the reorder information.

17. The electronic device of claim 9, wherein the processing circuit further performs following step:
(F) performing steps (B) to (E) when a time-out occurs, wherein the reorder information indicates the network packets whose sequence numbers are not consecutive.

18. An operation method of a network interface device, wherein the network interface device is coupled to a host, and the host comprises a storage circuit, the operation method comprising:
receiving a plurality of network packets;
parsing the network packets to obtain a plurality of sequence numbers of the network packets;
reordering the network packets based on the sequence numbers to generate reorder information;
appending the reorder information to one of the network packets and generating packet order information, or generating the packet order information containing the reorder information;
storing the network packets in the storage circuit;
storing the packet order information in the storage circuit; and
issuing an interrupt to the host.

19. The operation method of claim 18, wherein the storage circuit stores a buffer list and a buffer usage status, the buffer list lists a plurality of buffer addresses, and the buffer usage status records a usage status of a plurality of buffers corresponding to the buffer addresses.

20. The operation method of claim 19 further comprising:
updating the buffer usage status after storing the network packets in the storage circuit.

* * * * *